(12) United States Patent
Deen et al.

(10) Patent No.: US 8,359,391 B2
(45) Date of Patent: *Jan. 22, 2013

(54) APPARATUS AND COMPUTER-READABLE MEDIA FOR PROCESSING HTTP REQUESTS DETERMINE SCOPING MAPPING BETWEEN A MAPPED RESOURCE NAME EXTENSION AND A CONTENT TYPE

(75) Inventors: Brian J. Deen, North Bend, WA (US); Henry L. Sanders, Kirkland, WA (US); Joel M. Soderberg, Duvall, WA (US); Van C. Van, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,109

(22) Filed: Jan. 20, 2012

(65) Prior Publication Data

US 2012/0124215 A1 May 17, 2012

Related U.S. Application Data

(60) Continuation of application No. 12/749,454, filed on Mar. 29, 2010, now Pat. No. 8,103,720, which is a continuation of application No. 10/954,746, filed on Sep. 30, 2004, now Pat. No. 7,689,564, which is a continuation of application No. 10/382,943, filed on Mar. 6, 2003, now Pat. No. 7,457,805, which is a division of application No. 09/360,776, filed on Jul. 26, 1999, now Pat. No. 6,629,127.

(51) Int. Cl.
*G06F 15/16* (2006.01)
*G06F 17/30* (2006.01)

(52) U.S. Cl. ........ 709/226; 709/203; 709/206; 707/705; 707/831

(58) Field of Classification Search ................... 709/203, 709/206, 216–220; 707/790, 793, 811, 821–822, 707/827–831; 715/205–209
See application file for complete search history.

(56) References Cited

U.S. PATENT DOCUMENTS 5,013,498 A 5/1991 Froeschke
5,093,779 A 3/1992 Sakurai
(Continued)

FOREIGN PATENT DOCUMENTS
EP 0909070 A2 4/1999
(Continued)

OTHER PUBLICATIONS

Research Disclosure "Client Application for Integrating a Development Environment with a Web Distributed Authoring (WebDAV) Server", Apr. 1, 1999, one page.*

(Continued)

*Primary Examiner* — Srirama Channavajjala
(74) *Attorney, Agent, or Firm* — Woodcock Washburn LLP

(57) ABSTRACT

Various embodiments of the invention are directed to closely integrating functionality between an internet server and a WebDAV tool. Areas of specific focus in this document include delegation of duties between the internet server and the WebDAV tool, efficient management of a resource's content-type, support for segregation of a namespace into separate virtual roots, and determinations of whether to invoke certain processing extensions to handle requests for a given HTTP verb.

16 Claims, 11 Drawing Sheets

U.S. PATENT DOCUMENTS

| | | | |
|---|---|---|---|
| 5,689,706 A * | 11/1997 | Rao et al. ............................ 1/1 |
| 5,754,772 A | 5/1998 | Leaf |
| 5,765,156 A * | 6/1998 | Guzak et al. .................. 707/756 |
| 5,768,515 A | 6/1998 | Choquier et al. |
| 5,774,660 A * | 6/1998 | Brendel et al. ............... 709/201 |
| 5,793,966 A | 8/1998 | Amstein et al. |
| 5,812,768 A | 9/1998 | Page et al. |
| 5,864,870 A | 1/1999 | Guck |
| 5,875,296 A * | 2/1999 | Shi et al. ........................ 726/5 |
| 5,901,148 A | 5/1999 | Bowen et al. |
| 5,911,776 A | 6/1999 | Guck |
| 5,913,024 A * | 6/1999 | Green et al. .................... 726/3 |
| 5,941,947 A | 8/1999 | Brown et al. |
| 6,026,440 A | 2/2000 | Shrader et al. |
| 6,052,710 A | 4/2000 | Saliba et al. |
| 6,078,929 A | 6/2000 | Rao |
| 6,078,948 A | 6/2000 | Podgorny et al. |
| 6,096,096 A | 8/2000 | Murphy et al. |
| 6,105,028 A | 8/2000 | Sullivan et al. |
| 6,154,751 A | 11/2000 | Ault et al. |
| 6,195,692 B1 | 2/2001 | Hsu |
| 6,209,026 B1 | 3/2001 | Ran et al. |
| 6,256,031 B1 | 7/2001 | Meijer et al. |
| 6,263,330 B1 | 7/2001 | Bessette |
| 6,308,179 B1 | 10/2001 | Petersen et al. |
| 6,351,748 B1 | 2/2002 | Deen et al. |
| 6,356,863 B1 | 3/2002 | Sayle |
| 6,393,429 B1 | 5/2002 | Yagi et al. |
| 6,408,298 B1 | 6/2002 | Van et al. |
| 6,449,633 B1 | 9/2002 | Van et al. |
| 6,493,749 B2 * | 12/2002 | Streifert et al. ............... 709/220 |
| 6,626,957 B1 | 9/2003 | Lippert et al. |
| 6,629,127 B1 * | 9/2003 | Deen et al. .................... 709/203 |
| 6,633,900 B1 | 10/2003 | Khalessi et al. |
| 6,662,220 B1 | 12/2003 | Meyer |
| 6,675,353 B1 * | 1/2004 | Friedman ...................... 715/239 |
| 6,892,382 B1 | 5/2005 | Hapner et al. |
| 6,911,776 B2 | 6/2005 | Nishida |
| 6,947,991 B1 | 9/2005 | Burton et al. |
| 7,246,170 B2 | 7/2007 | Kanai et al. |
| 7,457,805 B2 * | 11/2008 | Deen et al. ........................ 1/1 |
| 7,502,835 B1 | 3/2009 | Cheng |
| 7,689,564 B2 * | 3/2010 | Deen et al. ............... 707/999.01 |
| 7,822,793 B2 | 10/2010 | Rawat et al. |
| 8,103,720 B2 * | 1/2012 | Deen et al. .................... 709/203 |
| 2002/0077842 A1 | 6/2002 | Charisius et al. |
| 2003/0037069 A1 | 2/2003 | Davison |
| 2003/0140115 A1 | 7/2003 | Mehra |
| 2004/0092271 A1 | 5/2004 | Vikari et al. |
| 2004/0162918 A1 * | 8/2004 | Freidman et al. ............. 709/246 |
| 2004/0163086 A1 * | 8/2004 | Friedman et al. ............. 719/310 |
| 2005/0177595 A1 | 8/2005 | Krieg et al. |
| 2006/0200740 A1 | 9/2006 | Kahn et al. |
| 2007/0073637 A1 * | 3/2007 | Kong ................................ 707/1 |
| 2011/0125806 A1 * | 5/2011 | Park ............................... 707/803 |

FOREIGN PATENT DOCUMENTS

| | | |
|---|---|---|
| EP | 1039398 A2 | 9/2000 |
| WO | WO 99/16225 A1 | 4/1999 |
| WO | WO 02/13018 A2 | 2/2002 |
| WO | WO 02/17140 A2 | 2/2002 |
| WO | WO 02/19226 A1 | 3/2002 |
| WO | WO 2007/027426 A1 | 3/2007 |

OTHER PUBLICATIONS

David Sussman, "WebDAV: A Panacea for Collaborative Authoring?", pp. 76-79, Apr.-Jun. 1999.*

James Whitehead et al. "WEBDAV:IETF Standard for Collaborative Authoring on the Web", IEEE Internet Computing, 1998, pp. 34-40.*

Dong-Ho Kim et al. "Supporting Effective Collaborative Works Based on WebDAV",FOST2006 IEEE, pp. 235-238.*

Changtao Qu, et al. "Implementation of a Document Management System Based on Webdav Protocol", ICMiT 2000, IEEE, pp. 752-757.*

Dambekalns, "WebDAV access to TYP03", Aug. 19, 2005, 1-11.

Evans et al., "A web-based resource migration protocol using webDAV", Proceedings of the 11th international conference on World Wide Web, Honolulu, Hawaii, USA, (no month available) 2002, 263-271.

Lee et al. "PosCFS+: A Self-Managed File Service in Personal Area Network", ETRI Journal, Jun. 2007, 29(3), 281-291.

Slein et al., "Requirements for distributed authoring and versioning on the World Wide Web", ACM, Mar. 1997, 5(1) 17-24.

Sussman, "WebDAV: A Panacea for Collaborative Authoring?", IEEE, Apr.-Jun. 1999, 76-79.

Whitehead, Jr., et al. "WebDAV: IETF standard for collaborative authoring on the Web", IEEE Internet Computing, Sep.-Oct. 1998, 34-40.

Whitehead, Jr., et al., "The webDAV property design", Software practice and experience, Department of Computer Science, University of California, Santa Cruz, (no month available) 2003, 1-24.

Client Application for Integrating a Development Environment with a Web Distributed Authoring (WebDAV) Server,Research Disclosure, Apr. 1999, UK, one page only.

Greg Stein,WebDAV: Distributed Authoring and Versioning,Adobe Technical Seminar Series, May 1999, 73 pages.

Y. Goland et al. "HTTP Extensions for Distributed Authoring—WEBDAV", Feb. 1999, 72 pages.

E. James Whitehead, Jr., "World Wide Web Distributed Authoring and Versioning (WEBDAV): An Introduction",ACM StandardView, Mar. 1997, pp. 1-10.

J.Simonson et al. "Version augmented URIs for reference permanencevia an Apache module design", Computer networks and ISDN System 30 (1998) 337-345.

Jim Whitehead,, University of California, Santa Cruz, "WebDAV:Versatile Collaboration Multiprotocol",IEEE Internet Computing,Jan. o Feb. 2005, pp. 66-74.

Ralph Peters et al. Crystal Web—A distributed authoring environment for the World-Wide Web, Computer Networks and ISDN Systems 27 (1995) 861-870.

* cited by examiner

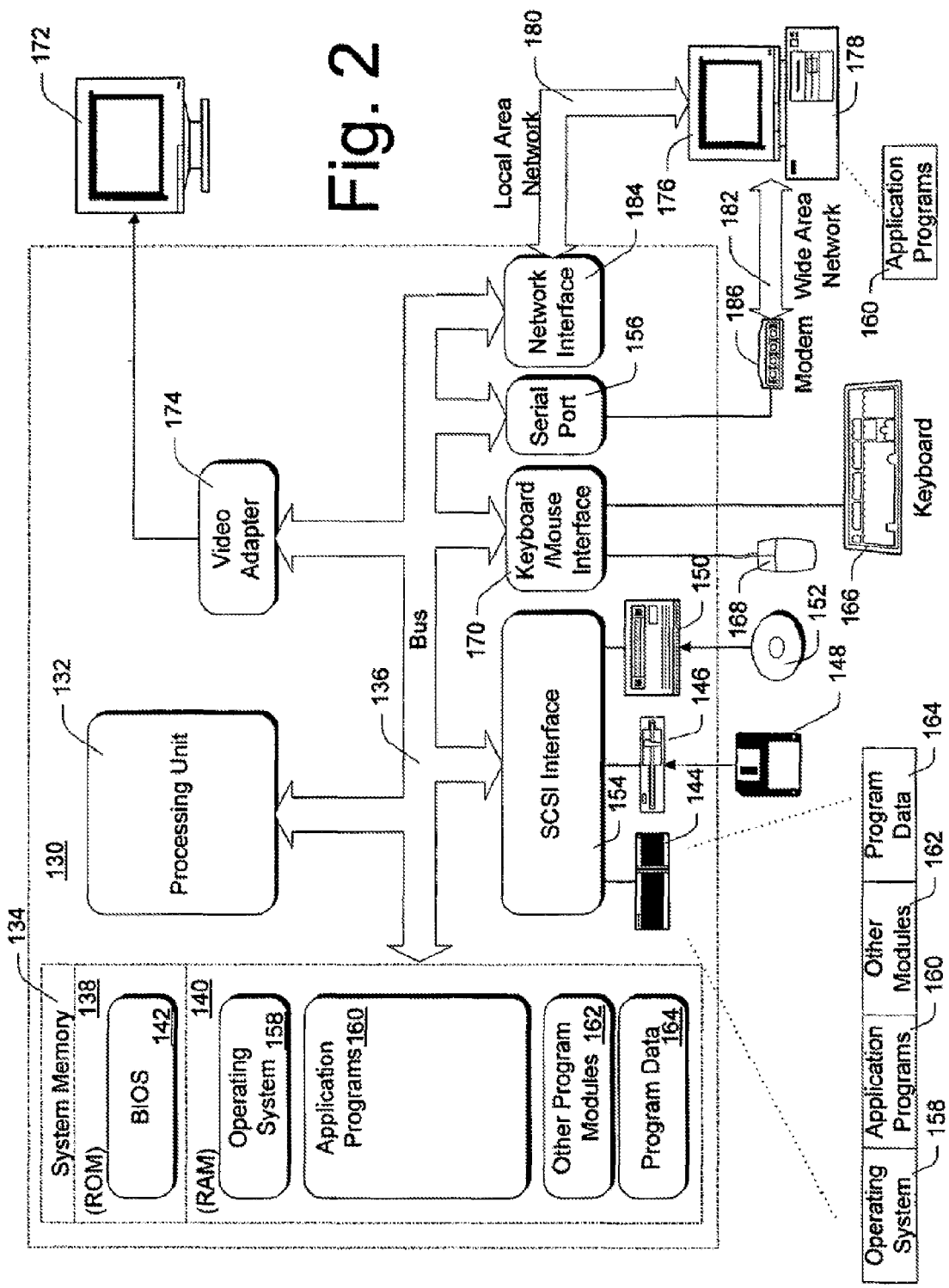

APPARATUS AND COMPUTER-READABLE MEDIA FOR PROCESSING HTTP REQUESTS DETERMINE SCOPING MAPPING BETWEEN A MAPPED RESOURCE NAME EXTENSION AND A CONTENT TYPE

CROSS-REFERENCE TO RELATED APPLICATIONS

This application is a continuation of, and claims priority to, U.S. patent application Ser. No. 12/749,454, filed Mar. 29, 2010, which is a continuation Ser. No. 10/954,746, filed Sep. 30, 2004, now U.S. Pat. No. 7,689,564, which is a continuation of, and claims priority to, U.S. patent application Ser. No. 10/382,943, filed Mar. 6, 2003, now U.S. Pat. No. 7,457,805, which is a divisional application of, and claims priority to, U.S. patent application Ser. No. 09/360,776, filed Jul. 26, 1999, now U.S. Pat. No. 6,629,127. The disclosures of all of the above-identified applications are hereby incorporated by reference in their entireties as if set forth herein in full.

TECHNICAL FIELD

This invention relates to apparatus and computer-readable media for implementing a method of processing HTTP requests. In particular, the invention concerns apparatus and computer-readable media for integrating web servers that are configured to handle certain types of HTTP requests with a WebDAV tool that is configured to handle WebDAV requests.

BACKGROUND

WebDAV is a technology that makes the Web a collaborative, writeable medium. WebDAV stands for "Web Distributed Authoring and Versioning." Today the Web is really read-only, where people mostly do downloading and reading operations. WebDAV makes it possible for web users wherever they are, whether separated by two houses or two continents, to write, edit and save shared documents without scuttling each other's work, regardless of which software program or Internet service they are using. Today, when people want to collaborate on a document, they usually pass it back and forth using email. This is a messy, error-prone process. Confusing email encoding problems can prevent successful sending of a document. Over time, sending files back and forth leads to problems keeping track of all the old versions of the file. Plus, in some companies, emailing a big file can take a long time when the network is busy. With WebDAV, the encoding problem goes away, and information is immediately available after it is saved. Instead of emailing the entire file, with WebDAV you just email the URL. WebDAV is also better than FTP because it is significantly faster, is in the same namespace as the actual published documents, and is consistent with other "web" tools. In addition, WebDAV has overwrite prevention and property management operations, both absent from FTP.

However, WebDAV goes beyond just Web page authoring. WebDAV is a set of extensions to the Hypertext Transfer Protocol (HTTP), which is the standard protocol that allows Web browsers to talk to Web servers. WebDAV and HTTP can accommodate all kinds of content, and so WebDAV can be used just as easily to collaboratively work on a word processing document, a spreadsheet, or an image file. Anything you can store in a file can potentially be authored using WebDAV, gaining its advantages.

WebDAV has three main features: overwrite prevention, properties, and namespace management. Overwrite prevention is important because it allows people to avoid the "lost update problem" that occurs as changes to a document are lost when several authors access and attempt to edit a file at the same time. By ensuring that people can work together without losing their changes, overwrite prevention is the key to WebDAV's collaboration support.

WebDAV's properties feature is an efficient means of storing and retrieving what is known as "metadata"—information about a web document such as the author's name, copyright, publication date and keywords that Internet search engines use to find and retrieve relevant documents. Finally, WebDAV also has what is called "namespace management" capabilities, which enables users to conveniently manage Internet files and directories, including the ability to move and copy files. The process is similar to the way word-processing files and directories are managed on a regular computer.

Another advantage of WebDAV is the ease with which individual Web pages can be made. On many sites, the process for getting Web pages up and running is very complicated. WebDAV-enabled applications can allow a person to just save to a URL, thus avoiding the hassles of shell accounts, FTP, and the details of how file system directories are mapped into URLs.

Additionally, many sites have a staged production process. This involves a content submission area, one or more staging areas, and a publicly visible area. Sites like this will not use WebDAV for the publicly visible area, since they want to maintain the integrity of the site. However, WebDAV offers a great deal for the content submission and staging areas. Big web sites often collect information from people across an organization, and sometimes from several different organizations. Very frequently, the contributors are geographically dispersed. WebDAV provides a standard way for contributors to submit their information. As a web site developer, one can create a submission area, hand out its URL, and let people save directly to it.

While WebDAV is very useful insofar as its ability to enable distributed authoring and versioning, integrating its functionality with existing Internet servers poses challenges that must be overcome if the two systems are to coexist peacefully. One such challenge relates to the processing of HTTP requests that operate on more than one file resource. In an HTTP environment, a virtual namespace is exposed to clients. The virtual namespace defines resources in terms of a tree-like directory and sub-directory hierarchy. However, this directory hierarchy does not necessarily correspond to the actual physical storage media upon which the resources reside. Rather, virtual directories and sub-directories, often referred to as "virtual roots," are mapped to different physical storage locations that might not correspond to the virtual directory hierarchy.

HTTP requests of the past (GET and HEAD requests in particular) did not pose a problem in this environment because these requests simply operated upon one and only one specified resource. With the advent of WebDAV, however, it is more likely than not that requests will involve or specify operations on a plurality of different resources, potentially involving disparate physical locations.

Along with this traversal operation arise concerns associated with integrating the conventional web server functionality with the newer WebDAV functionality so that operation is transparent to the client.

This invention arose out of concerns associated with providing methods and systems for integrating WebDAV with current Internet servers.

SUMMARY

Methods and systems of processing HTTP requests are described. Aspects of the invention include a WebDAV tool and an internet server. In the described embodiment, these components are integrated in a system for processing HTTP requests. The system receives a request that specifies an HTTP verb. The system determines whether the specified HTTP verb is one of a set of one or more predetermined HTTP verbs. If the specified verb is not one of these verbs, then the system passes the request to the WebDAV tool for processing. Otherwise, the system passes the request to the internet server. Other determinations can be made by the system based upon whether there appears to be any state associated with a request or whether the request is a request for data or a request for the source that generates the data.

In another aspect, a WebDAV request is received that specifies a resource name extension and a content type. The system ascertains whether current mapping scenarios, e.g. MIME maps that map resource name extensions to content types, is adequate to map the specified name extension to its specified content type. A new mapping scenario is created if the current mapping scenarios are inadequate. The new mapping scenarios are defined by setting a property on a specified resource through the use of the property-setting capabilities of WebDAV.

Another aspect of the invention involves segregating a namespace to have different physical locations, each of which is associated with a different virtual root of the namespace. A plurality of rules are defined and relate to how particular resources are to be operated upon at the different physical locations. When an HTTP request is received that can involve operations at different physical locations, the system ascertains, based upon the rules, whether execution of the request would violate one of the rules. If doing so would violate a rule, then the request (or at least a portion of the request) fails. Different exemplary rules include those that are associated with different administrative properties or security settings that might be set at the different physical locations, different authentication models that can be set at the different physical locations, and whether or not an ISAPI extension is registered to handle the request, to name just a few.

In accordance with another aspect of the invention, the system ensures that requests that might traverse different physical locations do not undesirably change administrative attributes that are set at the physical locations. In the described embodiment, execution of MOVE and COPY requests are performed in a manner that maintains the administrative attributes of the source and destination namespaces, while permitting any MIME maps that are associated with the resource to follow the resource.

Other aspects involve resolving conflicts between child virtual roots of a specified namespace and physical storage locations when a request is capable of traversing multiple physical locations. Further aspects extent script mapping capabilities to provide for ISAPI extensions to be registered for definable HTTP verbs. Thus, any client requests that contain specified verbs can be handled by their associated registered ISAPI extensions.

BRIEF DESCRIPTION OF THE DRAWINGS

FIG. 2 is an overview of a computer system that can be used to implement various embodiments of the invention.

DETAILED DESCRIPTION OF ILLUSTRATIVE EMBODIMENTS

Overview

Various aspects are directed to closely integrating functionality between an internet server and a WebDAV tool. Areas of specific focus in this document include delegation of duties between the internet server and the WebDAV tool, efficient management of a resource's content-type, support for segregation of a namespace into separate virtual roots, and determinations of whether to invoke certain processing extensions to handle requests for a given HTTP verb.

Figure 1:
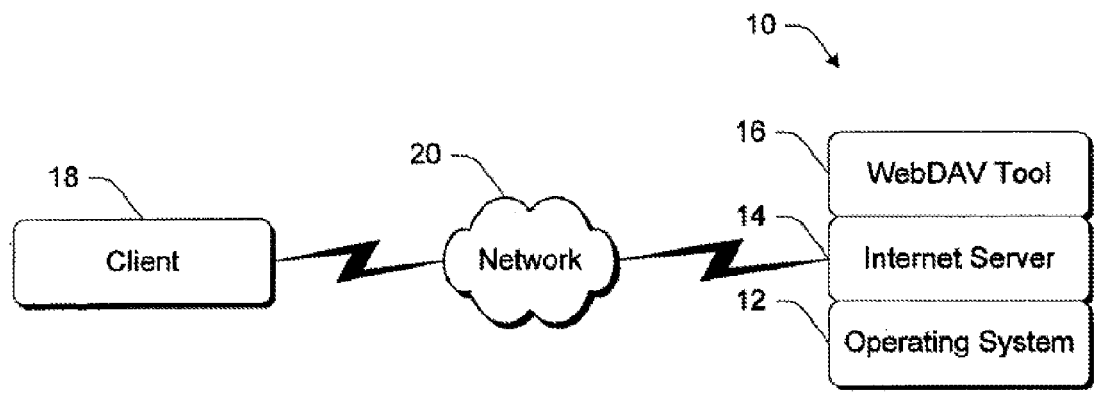
FIG. 1 is a high level system diagram that illustrates an internet server and a WebDAV tool.

FIG. 1 shows an exemplary system architecture generally at 10 that is suitable for use in connection with the various embodiment that are described below. System 10 typically includes an operating system 12, an internet server 14 executing on the operating system, and a WebDAV tool 16. An exemplary operating system and internet server is Microsoft's Windows 2000 Server operating system and Internet Information Server (IIS), respectively. An exemplary WebDAV tool is implemented as an Internet Service Application Programming Interface (ISAPI) extension. ISAPI extensions are dynamic link libraries (DLLs) that can be loaded into the same memory space occupied by IIS, and act as an interface between the client or user and IIS. A client 18, which is typically a software program communicates with internet server 14 over a network 20 such as the Internet. Typically, client 18 will send a request to the internet server 14 that includes an HTTP method or verb. Many times, the method or verb is a GET method (discussed in more detail below). The server 14 receives the request and processes the HTTP request headers that accompany the request. In addition, the server 14 maps the URL contained in the request to a physical path (for example, the URL "http://server/document.htm" that might be contained in a request can get mapped to "d:\inetpub\wwwroot\document.htm"). The request may also include user name and password information that requires authentication by the server. The server and potentially a server application then send HTTP headers to the client followed by the response data. The server can then end the session or may keep the session open.

Computer System

FIG. 2 shows a general example of a computer 130 that can be used in accordance with the invention. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

HTTP Methods or Verbs

The HTTP protocol is a request/response protocol as the above example indicates. A client sends a request to the server in the form of a request method, URI, and protocol version, followed by a MIME-like message containing request modifiers, client information, and possible body content over a connection with a server. The server responds with a status line, including the message's protocol version and a success or error code, followed by a MIME-like message containing server information, entity meta information, and possible entity-body content. The reader is assumed to have some familiarity with HTTP methods or verbs. A set of common request methods for the HTTP 1.1 protocol include the following methods: Head, Get, Put, Post, Delete, Trace, and Options. Each of these methods are briefly described in the table appearing just below:

| HTTP Methods or Verbs | |
|---|---|
| Get | The GET method means retrieve whatever information (in the form of an entity) is identified by the Request-URI. If the Request-URI refers to a data-producing process, it is the produced data which shall be returned as the entity in the response and not the source text of the process, unless that text happens to be the output of the process. |
| Head | The HEAD method is identical to GET except that the server MUST NOT return a message-body in the response. The meta information contained in the HTTP headers in response to a HEAD request SHOULD be identical to the information sent in response to a GET request. This method can be used for obtaining meta information about the entity implied by the request without transferring the entity-body itself. This method is often used for testing hypertext links for validity, accessibility, and recent modification. |
| Put | The PUT method requests that the enclosed entity be stored under the supplied Request-URI. If the Request-URI refers to an already existing resource, the enclosed entity |

-continued

| HTTP Methods or Verbs | |
|---|---|
| | SHOULD be considered as a modified version of the one residing on the origin server. If the Request-URI does not point to an existing resource, and that URI is capable of being defined as a new resource by the requesting user agent, the origin server can create the resource with that URI. |
| Post | The POST method is used to request that the origin server accept the entity enclosed in the request as a new subordinate of the resource identified by the Request-URI in the Request-Line. POST is designed to allow a uniform method to cover the following functions: (1) annotation of existing resources, (2) posting a message to a bulletin board, newsgroup, mailing list, or similar group of articles, (3) providing a block of data, such as the result of submitting a form, to a data-handling process, and (4) extending a database through an append operation. |
| Delete | The DELETE method requests that the origin server delete the resource identified by the Request-URI. |
| Trace | The TRACE method is used to invoke a remote, application-layer loop- back of the request message. TRACE allows the client to see what is being received at the other end of the request chain and use that data for testing or diagnostic information. |
| Options | The OPTIONS method represents a request for information about the communication options available on the request/response chain identified by the Request-URI. This method allows the client to determine the options and/or requirements associated with a resource, or the capabilities of a server, without implying a resource action or initiating a resource retrieval. |

WebDAV HTTP Methods or Verbs

WebDAV is an extension to the HTTP/1.1 protocol that allows clients to perform remote web content authoring operations. This extension provides a coherent set of methods, headers, request entity body formats, and response entity body formats that provide operations for properties, collections, locking and namespace operations. With respect to properties, WebDAV provides the ability to create, remove, and query information about Web pages, such as their authors, creation dates, etc. With respect to collections, WebDAV provides the ability to create sets of documents and to retrieve a hierarchical membership listing (like a directory listing in a file system). With respect to locking, WebDAV provides the ability to keep more than one person from working on a document at the same time. This prevents the "lost update problem," in which modifications are lost as first one author then another writes changes without merging the other author's changes. With respect to namespace operations, WebDAV provides the ability to instruct the server to copy and move Web resources.

In HTTP/1.1, method parameter information is exclusively encoded in HTTP headers. Unlike HTTP/1.1, WebDAV encodes method parameter information either in an Extensible Markup Language (XML) request entity body, or in an HTTP header. The use of XML to encode method parameters is motivated by the ability to add extra XML elements to existing structures, provide extensibility; and by XML's ability to encode information in ISO 10646 character sets, providing internationalization support. In addition to encoding method parameters, XML is used in WebDAV to encode the responses from methods, providing the extensibility and internationalization advantages of XML for method output, as well as input.

The following WebDAV HTTP methods use XML as a request and response format. The reader is assumed to have some familiarity with WebDAV HTTP methods or verbs. A brief description, however, of some pertinent WebDAV HTTP methods or verbs appears in the table immediately below:

| WebDAV HTTP Methods or Verbs | |
|---|---|
| PROPPATCH | The PROPPATCH method processes instructions specified in the request body to set and/or remove properties defined on the resource identified by the Request-URI. |
| PROPFIND | The PROPFIND method retrieves properties defined on the resource identified by the Request-URI, if the resource does not have any internal members, or on the resource identified by the Request-URI and potentially its member resources, if the resource is a collection that has internal member URIs. |
| LOCK | A LOCK method invocation creates the lock specified by the lockinfo XML element on the Request-URI. Lock method requests SHOULD have a XML request body which contains an owner XML element for this lock request, unless this is a refresh request. The LOCK request may have a Timeout header. The LOCK is used to take out a lock of any access type. |
| UNLOCK | The UNLOCK method removes the lock identified by the lock token in the Lock-Token request header from the Request-URI, and all other resources included in the lock. |
| MOVE | The MOVE operation on a non-collection resource is the logical equivalent of a copy (COPY), followed by consistency maintenance processing, followed by a delete of the source, where all three actions are performed automatically. The consistency maintenance step allows the server to perform updates caused by the move, such as updating all URIs other than the Request-URI which identify the source resource, to point to the new destination resource. Consequently, the Destination header MUST be present on all MOVE methods and MUST follow all COPY requirements for the COPY part of the MOVE method. |
| COPY | The COPY method creates a duplicate of the source resource, identified by the Request-URI, in the destination resource, identified by the URI in the Destination header. |
| SEARCH | The SEARCH method allows queries against the different properties. |
| MKCOL | The MKCOL method is used to create a new collection. |

Allocating Web Server/DAV Tool Functions

Figure 3:
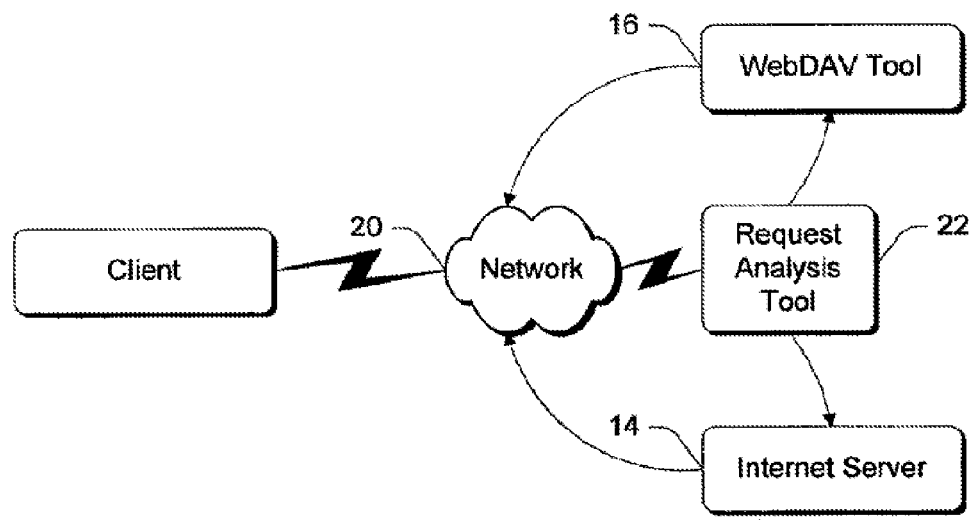
FIG. 3 is a high level system diagram, similar to FIG. 1, that illustrates a request analysis tool in accordance with one embodiment of the invention.

One aspect of the invention is directed to allocating processing functions between the WebDAV tool 16 and the internet server 14. FIG. 3 shows a schematic of one way in which this can be done. There, a request analysis tool 22 is shown. The request analysis tool can be a separate software module or can comprise part of the internet server 14. When a request is received from client 18, the request analysis tool 22 analyzes the request based upon definable criteria and sends the request to the appropriate processing entity, i.e. either the WebDAV tool 16 or the internet server 14. There are different criteria that can be defined in order to give the request analysis tool 22 the information it needs in order to make the appropriate selection between the WebDAV tool 16 and the internet server 14. The criteria discussed below constitute exemplary criteria only and are not intended to limit the invention to the specifically discussed criteria.

Verb-Based Allocation

The first criteria than can be used to assist in allocation of processing functions between the WebDAV tool 16 and the internet server 14 is a verb-based criteria. Here, recognition is made that certain HTTP verbs or methods are better handled by the internet server 14, while other HTTP verbs or WebDAV verbs are better handled by the WebDAV tool 16. As an example, consider the fact that over time, internet servers have evolved to do a very limited and specific set of functions very well-serve up resources and/or data for access through HTTP. As a result of this evolution, the internet servers have come to serve up the resources very quickly and efficiently. The primary HTTP method or verb of interest in this scenario is the GET method or verb, and to a lesser degree, the HEAD method or verb. WebDAV, on the other hand, is directed to the creation, management and publishing of Web server content. To do this, WebDAV uses a very different set of methods or verbs. Hence, by recognizing that a logical division can be made between the HTTP verbs, the request analysis tool 22 can be configured to evaluate the HTTP verbs that are contained in the client's request, and send the requests to the appropriate processing tool—either the WebDAV tool 16 or the internet server 14.

Figure 4:
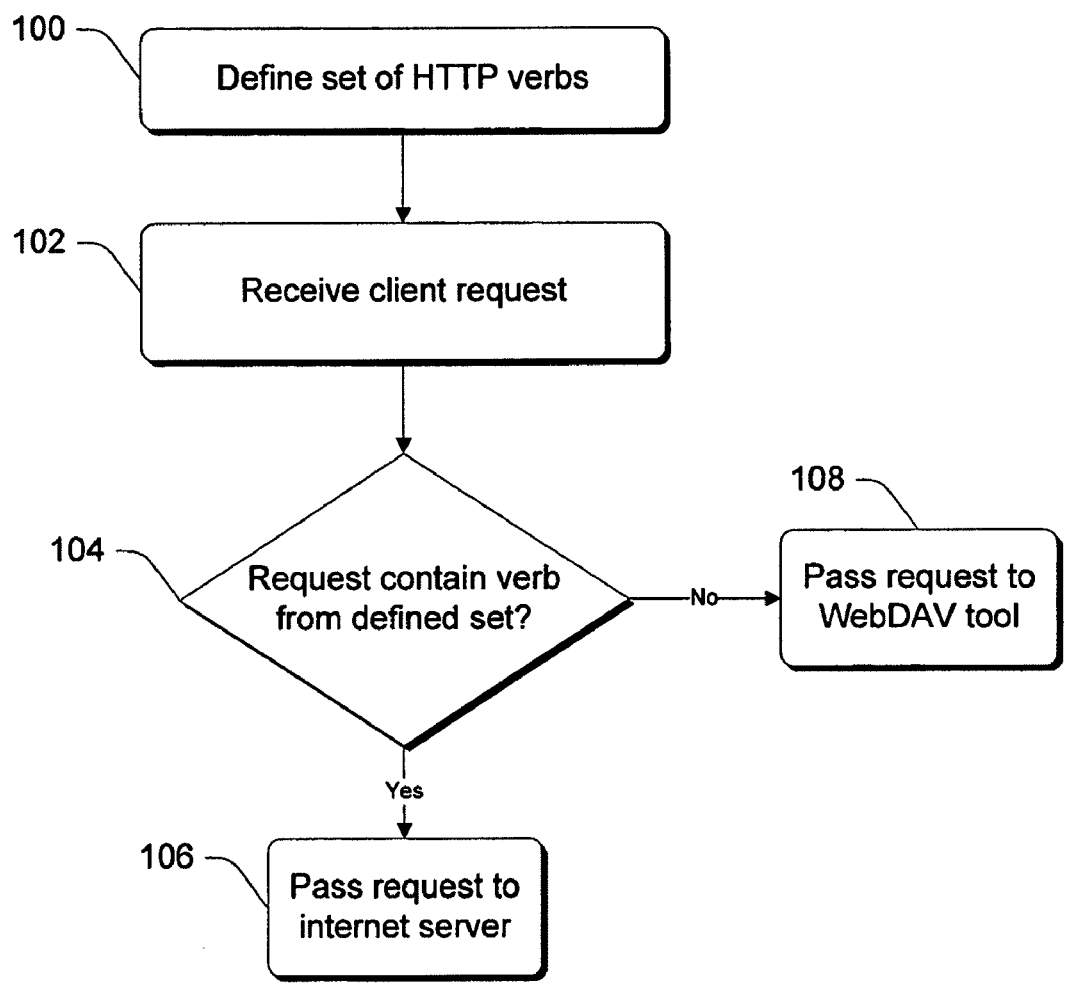
FIG. 4 is a flow diagram that describes steps in a method in accordance with one embodiment of the invention.

FIG. 4 shows a flow diagram that illustrates steps in a verb-based method for allocating the processing functions. Step 100 defines a set of one or more HTTP verbs. This set of HTTP verb(s) will be used by the request analysis tool 22 (FIG. 3) to evaluate client requests. In the described embodiment, the set contains one or both of the GET and HEAD verbs. In this example, the set definition recognizes that the internet server 14 is leveraged most efficiently when it is allocated the functions for which it has traditionally been developed. Of course, other sets can contain other HTTP verb groupings. Step 102 receives a client request and step 104 determines whether the request contains a verb from the defined set of HTTP verbs. If the request contains a verb from the defined set of HTTP verbs (in this example either the GET or HEAD verb), then step 106 sends the request to the internet server 14. If, on the other hand, the request contains a verb that is not from the defined set of HTTP verbs, step 108 sends the request to the WebDAV tool 16 for processing. It will be noted that some traditional HTTP verbs (defined in the first table above) will, in this example, be sent to the WebDAV tool 16 for processing.

State-Based Allocation

Figure 5:
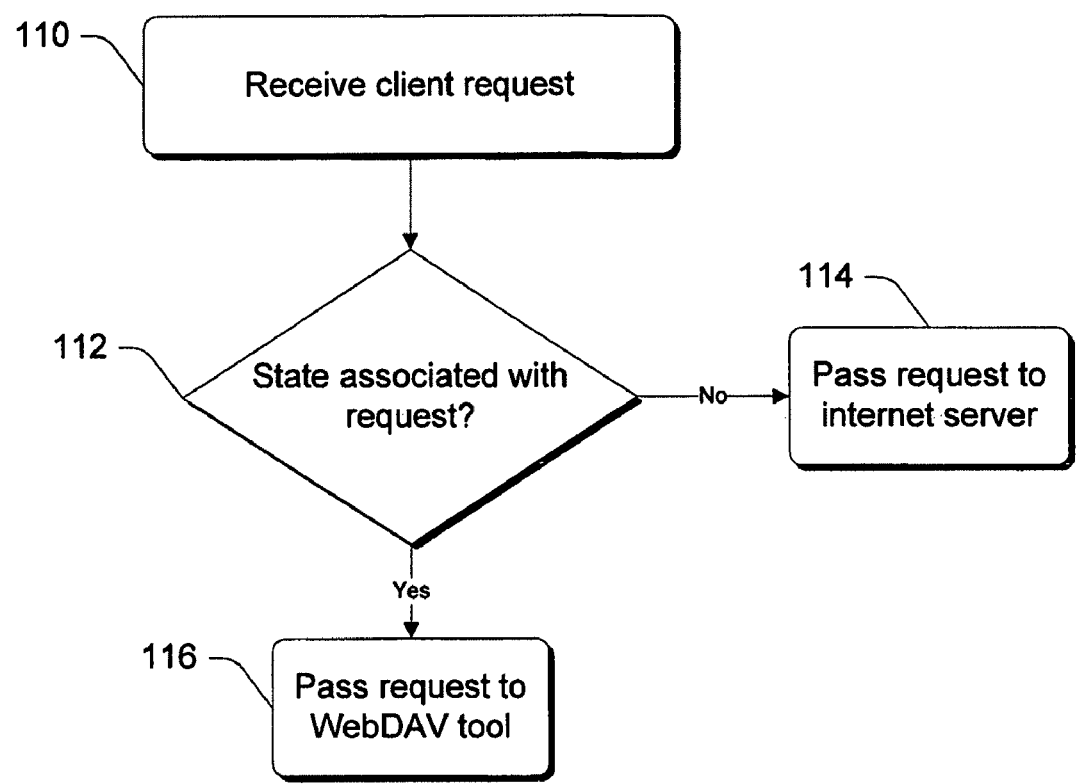
FIG. 5 is a flow diagram that describes steps in a method in accordance with one embodiment of the invention.

The second criteria than can be used to assist in allocation of processing functions between the WebDAV tool 16 and the internet server 14 is a state-based criteria. Here, the request analysis tool 22 evaluates the client request to determine whether there is any state associated with the request. If there is state associated with the request, then the WebDAV tool 16 receives the request. If there is not state associated with the request, then the internet server 14 receives and processes the request. FIG. 5 shows a flow diagram that describes steps in the method discussed just above. Step 110 receives a client request. Step 112 determines whether there is any state associated with the request. If there is no state associated with the request, then step 114 passes the request to the internet server 14 for processing. If there is state associated with the request, then step 116 passes the request to the WebDAV tool 16.

In the described embodiment, determination of whether there appears to be any state associated with a request can be ascertained by evaluating the headers that accompany the request. Specifically, requests that have state associated with them have a special header—an "IF" header, that indicates that there is some pending state that should be used in the handling of the request. Thus, when a request is received, the request analysis tool 22 evaluates the request headers looking specifically for an "IF" header. If such a header is found, then, in this example, the request is passed to the WebDAV tool 16 for processing. Otherwise, the request is processed by the internet server 14.

Consider the following example: The ability to lock a resource (through use of the LOCK verb) provides a mechanism for serializing access to that resource. Using a lock, an authoring client can provide a reasonable guarantee that another principal will not modify a resource while it is being edited. In this way, a client can prevent the "lost update" problem. A lock token is a type of state token, represented as a URI, which identifies a particular lock. A lock token is returned by every successful LOCK operation in the lockdiscovery property in the response body, and can also be found through lock discovery on a resource. A client may submit the lock token in subsequent requests that are sent to the server. This is done by submitting the lock token in an "IF" header. Thus, in this example, the subsequent request has state associated with it. This being the case, the request analysis tool 22 recognizes the "IF" header and the associated state and passes the request to the WebDAV tool. This is important because subsequent GET request handling may possibly need to be blocked based on the state described by the state token.

Source Access-Based Allocation

The third criteria than can be used to assist in allocation of processing functions between the WebDAV tool 16 and the internet server 14 is a source access-based criteria. Here, recognition is made of the fact that some requests, such as GET requests, are interested in data that is the result of some computational processing, while other requests are interested in the means by which the computational processing takes place, i.e. the scripts that produced the data. For example, if a client wants to publish or author a site, then doing a GET request will produce only the data that is itself produced by a script. It will not produce the source of the data—the script itself. The script itself is produced by requesting the source of the data. This is known as source access.

Figure 6:
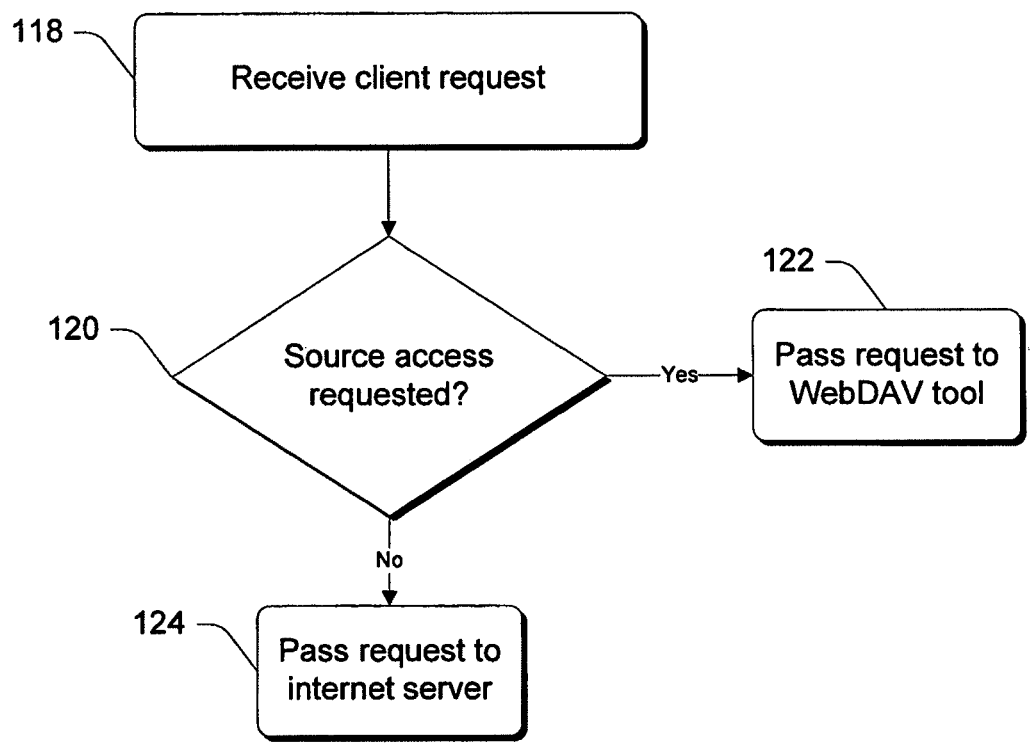
FIG. 6 is a flow diagram that describes steps in a method in accordance with one embodiment of the invention.

FIG. 6 shows a flow diagram that describes steps in a method for allocating processing functions based upon whether a request is for source access or not. Step 118 receives a client request and step 120 determines whether source access is requested. If source access is requested, step 122 passes the request to the WebDAV tool for processing. Part of the processing that can take place in the WebDAV tool includes determining whether or not there is a source for the specified resource, determining whether the client has access to the source, and returning an appropriate response to the client. If source access is not requested, then step 124 passes the request to the internet server 14.

Although the three criteria discussed above are described separately, it is to be understood that the request analysis tool 22 can be configured to perform evaluations of an incoming request using each of the criteria, or any combination thereof. It is also to be understood that criteria other than that which is specifically described in this document can be defined and used without departing from the spirit and scope of the invention. By allocating processing functions between the internet server 14 and the WebDAV tool 16, the two components are integrated and can coexist thereby providing a complete implementation without requiring each of the components to duplicate any part of the operations of the other. In addition, request processing is streamlined and takes place in a time-saving, effective manner. Specifically, and in the example above, by leveraging the request processing capabilities of the internet server 14 and passing all other requests to the WebDAV tool, efficient use is made of the internet server 14.

Mapping and Content Types

Resources that are accessible through HTTP requests typically have content-type data associated with them. The content-type data is returned to the client with the requested resource. Content type data gives an indication of what kind of resource a given resource is (i.e. the format of the resource) so that it can be handled appropriately by a client. For example, a given resource may be a document called "foo.doc". This particular document may be a Microsoft Word document. In order for a client to know that the document is a Word document, content-type data is associated with the document at the internet server 14. In the described IIS embodiment, the content-type data association is made in a storage facility called the metabase. In this particular example, the content-type data would indicate that the ".doc" extension on a specified resource should be mapped to a content type "application/msword". The content type "application/msword" then tells the client browser to invoke Word in order to serve up the document to the client.

When a client makes an HTTP request, e.g. a GET request, the request will specify a namespace that is associated with a resource of interest. For example, the request may specify the namespace "http:\\www.document.com". This namespace may point to many different physical locations that contain resources that are associated with the namespace. The resources are simply unified under a common namespace that can be used in the client request. This type of a namespace is referred to as a "virtual" namespace because it may have one or more different physical locations associated with it where different resources are located. Thus, when the server receives a client request that contains a virtual namespace, it typically maps the virtual namespace to the one or more physical locations where the requested resources are located.

One way to maintain an association between content-type data (also referred to as "content types") and their associated file extensions is through the use of Multi-purpose Internet Mail Extension maps or MIME maps. MIME maps correlate a resource name extension to the MIME content type that indicates the format of the resource. An example of this was given above. One feature of MIME maps that is particularly useful is that they are "scoping" in nature. This means that the association that is defined for the resource name extension and the content type holds true for all resources that have a namespace that is an extension of the namespace where the MIME map is stored. As an example consider the following: Assume that there is a MIME map that is defined or stored for the namespace "/documents/sales" that maps all of the namespaces that have the "log" extension to a content-type of "application/salestracker". Assume further that a client request is received that specifies a resource by the following namespace: "/documents/sales/west-coast.log". Because of the scoping nature of MIME maps, the "west-coast.log" resource would have a content type "application/salestracker" that is defined for the namespace "/documents/sales".

By using a MIME map to designate the content-type of a resource, the content-type can be stored only once for as many resources that use the mapping. Otherwise, the content-type value would need to be stored once for each resource. Using MIME maps also assists the internet server 14 in GET processing because it can retrieve the content-type without having to know the format of the non-content type-properties of a given resource.

Embodiments of the invention are directed to closely integrating the functionalities of the WebDAV tool 16 and the internet server 14 insofar as MIME map use is concerned. When a request is received from a client, the mapping scenarios are evaluated and adjustments are made if the mapping scenarios are not adequate to address mapping needs that might arise. In the described embodiment, the mapping scenarios are capable of being adjusted on each resource on an individual basis. This can take place through the use of a WebDAV technique that sets a content-type property on the resource that gets returned with the resource when a subsequent GET request is received. This is an improvement over past methods that only enabled content-types to be defined at the folder level. There, every file in a folder had a content-type association that was defined for the folder. Here, as will become apparent below, one advantage is that many different files can be stored in a single folder, with each file having a different content-type that is associated with it and which gets returned when a GET request for that resource is received.

Figure 7:
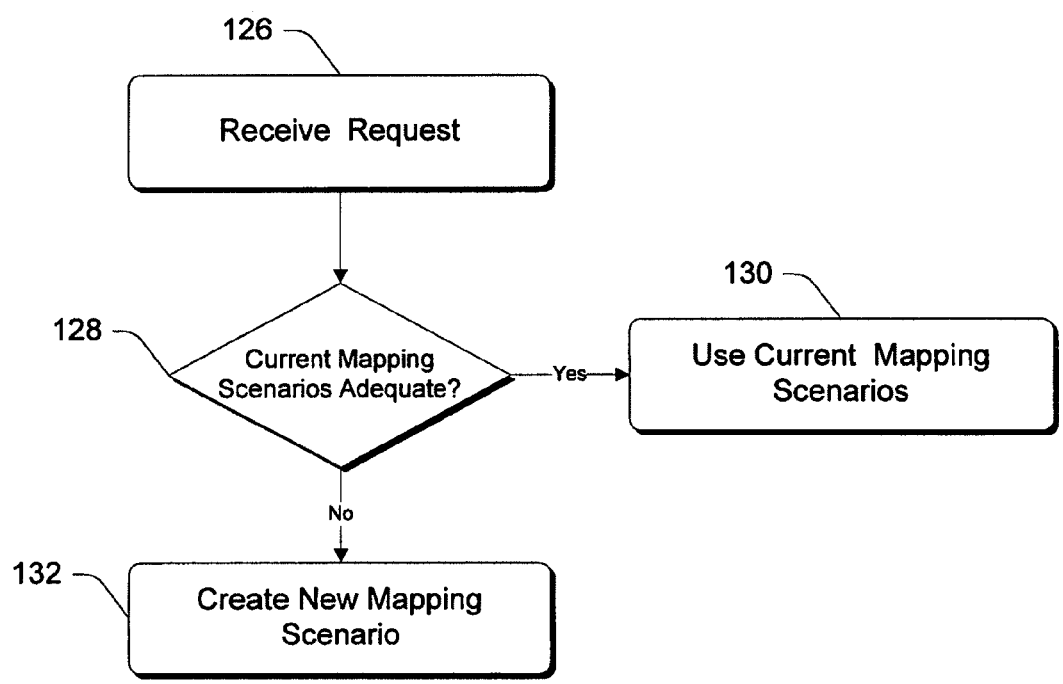
FIG. 7 is a flow diagram that describes steps in a method in accordance with one embodiment of the invention.

FIG. 7 shows a flow diagram that describes a method for determining whether the current mapping scenarios are adequate. Step 126 receives a client request. Step 128 determines whether the current mapping scenarios are adequate to map the specified extension to a content-type. If the current mapping scenarios are adequate, then step 130 uses the current mapping scenarios. If the current mapping scenarios are not adequate to map the specified extension to a content-type, then step 132 creates a new mapping scenario. In the described embodiment, different mapping scenarios are created through use of the property-setting capabilities of WebDAV.

As an example of an inadequate mapping scenario consider the following: Assume that there is a namespace called "/FS/Documents" and that this is a directory that is set up on a server. At the topmost level of the namespace, a MIME map is defined that maps ".doc" extensions to Microsoft Word. A client can then publish Word documents to this location and no additional association is needed because the MIME map that is defined for that location "scopes" all of the resources that are stored there. Assume now that the MKCOL method is used to make another directory "/FS/Documents/Notes". Assume also that the client desires to publish a document to this directory called "foo.doc" that is not a Word document. This creates an internal inconsistency because of the scoping nature of MIME maps. That is, when a client does a subsequent GET on the "foo.doc" resource, the incorrect content-type will be returned.

As another example of inadequate mapping scenarios consider the following: A client wishes to publish, through a PUT request, a Word document and a Notes document to the same directory and using the same ".doc" extension. Because of the scoping nature of the MIME map, the Notes document would be returned with an incorrect content-type. There may also be situations arise where a content-type for a resource is specified in a PUT request, but there is no existing MIME map for that resource.

Figure 8:
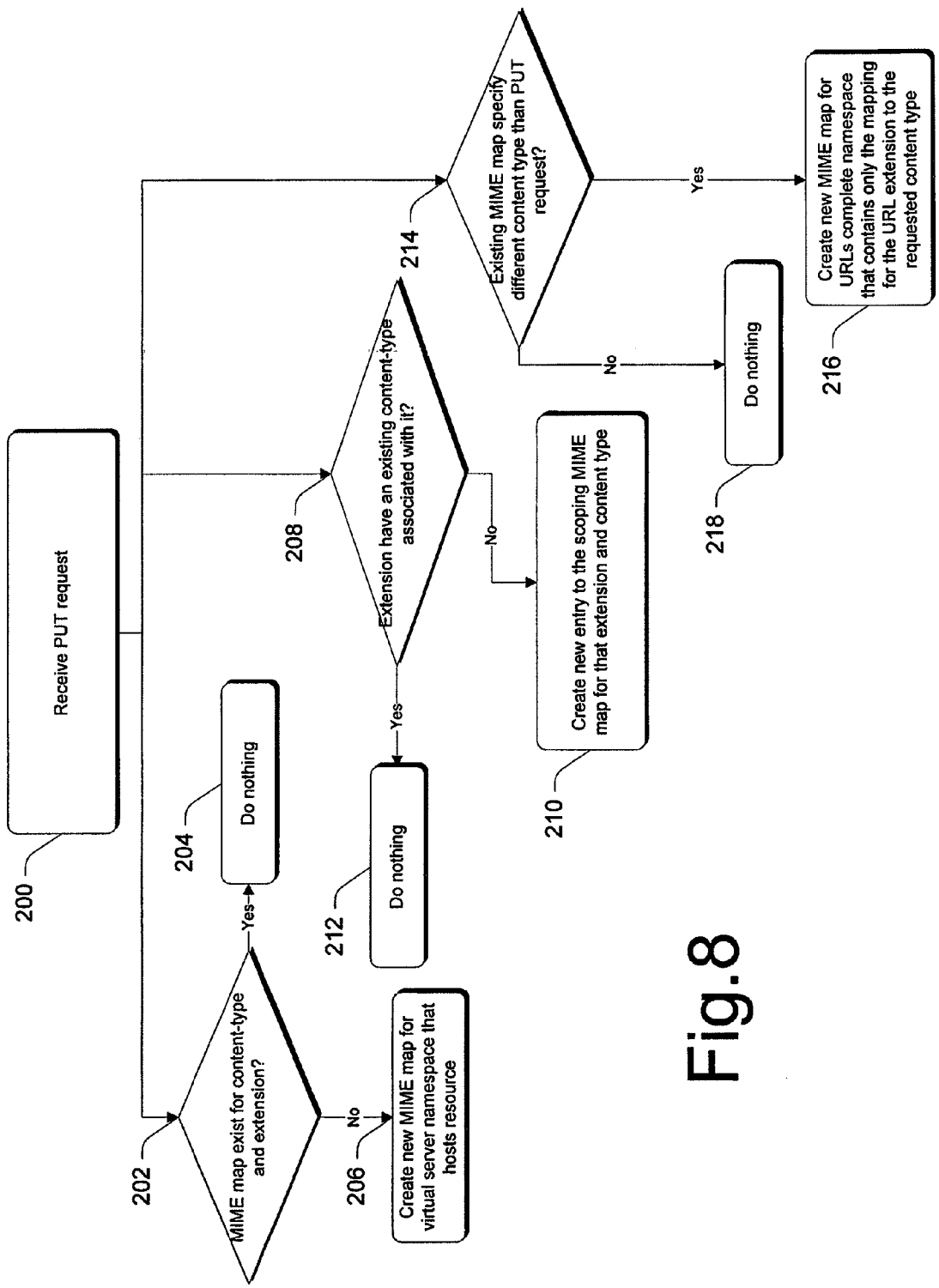
FIG. 8 is a flow diagram that describes steps in a method in accordance with one embodiment of the invention.

FIG. 8 shows a flow diagram that describes steps in a method in accordance with one embodiment of the invention. The FIG. 8 method is directed to ensuring that content-types that are handed in with WebDAV PUT requests are the same content-types that are returned when a subsequent GET request is received. Step 200 receives a client PUT request that specifies a resource name extension and a content type. Step 202 ascertains whether a MIME map exists for the specified content-type and extension that scopes the resource. If there is, then nothing is done (step 204). If there is no MIME map for the specified content-type and extension pair, then step 206 creates a new MIME map for the virtual server namespace that hosts the resource. Thus, this branch of the FIG. 8 diagram is directed processing where there is not a MIME map that maps the desired content-type and extension pair. There may be instances where a particular MIME map includes an entry for an extension, but no entry for the content-type. In this instance, step 208 ascertains whether there is an association between the extension and any existing content-type in any scoping MIME map. If there is no association between the extension and any existing content-type, then a new entry is created (step 210) for the scoping MIME map for that extension and content-type. If there is an association, then nothing is done (step 212).

There may be situations where a PUT request specifies a content-type for an extension that is different from a content type that is defined for that extension in a scoping MIME map. Step 214 ascertains whether an existing MIME map specifies a different content-type than the PUT request. If it does, then step 216 creates a new MIME map for the URL's complete namespace that contains only the mapping for the URL extension to the requested content-type. This ensures that only the existing, specified resource is scoped by this MIME map.

In the above examples, new MIME maps can be created through the use of the property-setting capabilities provided by WebDAV. Specifically, content-types for specific resources can be set as properties for that resource such that the correct content-type is returned for the resource when the resource is requested. Hence, the processing described just above ensures that GET request processing remains unchanged. That is, content-types that are specified by PUT requests are the very same content-types that are returned by subsequent GET requests—even when the content-types are new, different from, or, would be internally inconsistent with those that are already defined say, for example, in the same folder.

Support for Virtual Roots

Embodiments of the invention also provide support for so-called virtual roots—that is roots of virtual namespaces. Recall that a virtual namespace is a namespace that can have roots (i.e. virtual roots) that point to different physical locations. Each virtual root may point to a different physical location, but to the client, it looks as if the different physical locations are just sub-directories under a unified virtual namespace. The different physical locations can have different security settings, different authentication models, or any combination of administrative properties that apply to namespaces. Virtual roots gives an administrator the ability to scope namespaces with custom attributes.

Figure 9:
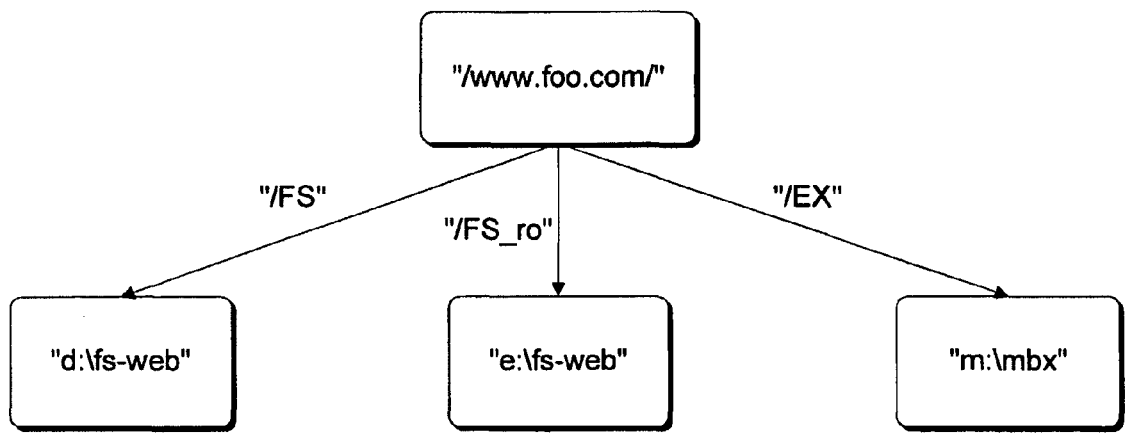
FIG. 9 is a diagram that illustrates one aspect of namespace virtual roots.

FIG. 9 gives one example of a namespace that has virtual roots that point to different physical locations. In this example, the namespace is "/www.foo.com/". This namespace has three sub-directories or virtual roots (e.g. "/FS", "/FS_ro" and "/EX") that, to a client, look like simple sub-directories under the top level namespace "/www.foo.com/". Each of these sub-directories, however points to a different physical location:

| SUB-DIRECTORY | PHYSICAL LOCATION |
|---|---|
| "/FS" | "d:\fs-web" |
| "/FS_ro" | "e:\fs-web" |
| "/EX" | "m:\mbx" |

The physical locations can be across a single or multiple machines. Further, parts of the namespace could be on an exchange server, a file system, or on a web server. In the past, GET methods have not posed any major problems when operating in an environment that includes virtual roots. This is largely because the GET method operates against only one resource at a time. Thus, when virtual roots are not crossed by the HTTP method, processing remains relatively uncomplicated. Complications can, however, arise when the particular HTTP methods or verbs cross or traverse multiple resources and/or virtual roots and attempt to operate upon resources. There are several WebDAV verbs that fall into this category, e.g. MOVE, COPY, PROPFIND, and SEARCH. For example, a client may wish to take a "read only" file from its current location and MOVE or COPY the file to a "read and write" location. As another example, a client may do a PROPFIND on the "/www.foo.com/" namespace at a depth of infinity (this gives the sets of properties for everything under this hierarchy). If the physical locations "d:\fs-web" and "e:\fs-web" are files locations, then the PROPFIND will simply deliver up all of the files in these locations. The location "m:\mbx" is not, however, a file location. Rather, it is an exchange store and the PROPFIND cannot deliver up any data from here.

When dealing with verbs that have the potential to traverse multiple resources and/or virtual roots, a number of limiting issues, examples of which are given above, arise that must be addressed.

Use of Exemplary Virtual Root Rules

Figure 10:
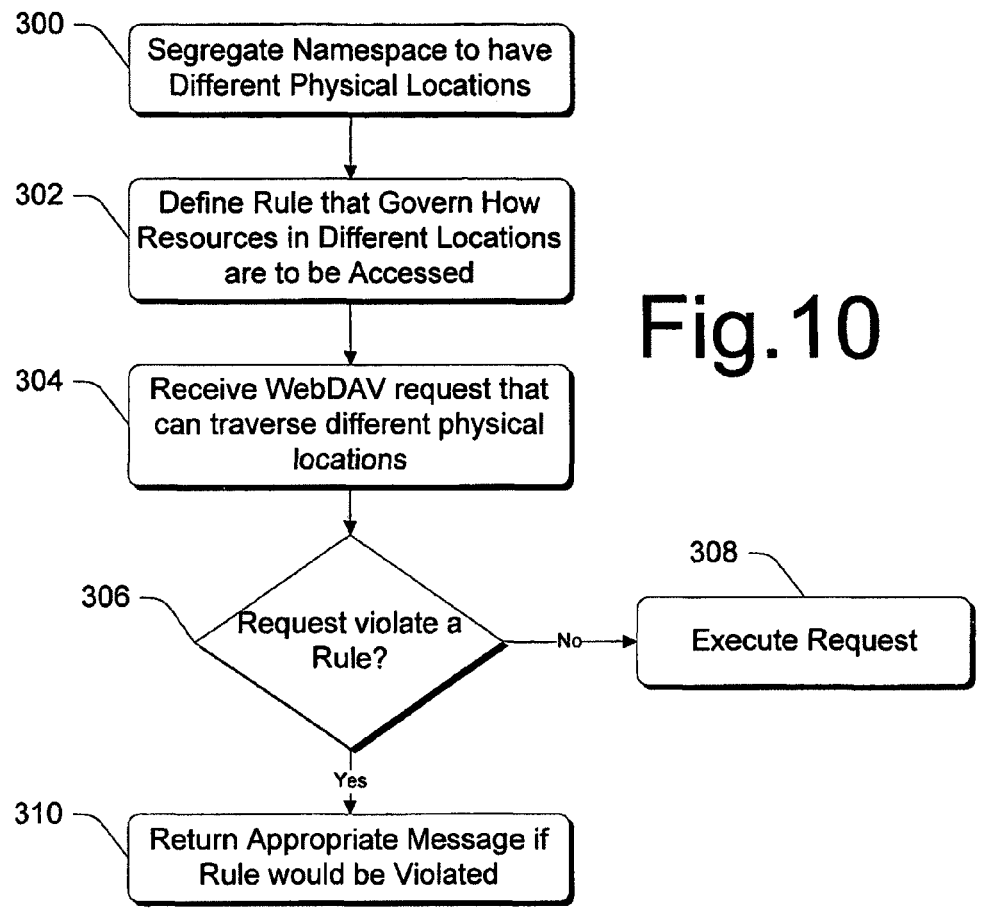
FIG. 10 is a flow diagram that describes steps in a method in accordance with one embodiment of the invention.

FIG. 10 shows a flow diagram that describes steps in a method in accordance with various embodiments of the invention. Step 300 segregates a namespace to have different physical locations at which various resources can be located. The physical locations are associated with or define different virtual roots of the namespace. Step 302 defines a plurality of rules that govern how resources in the different physical locations are to be operated upon. An exemplary set of rules are described in the table below:

| | |
|---|---|
| Rule 1 | If there is a different authentication model between the resource referred to by the request URL and subsequent resources, then operation on the subsequent resources must fail. |
| Rule 2 | If there is an ISAPI extension that applies to a resource other than the one referred to by the request URL, and source access is not requested, then operation on those resources must fail. |
| Rule 3 | If there is a wild-card scriptmapping that applies to subsequent resources and is not applicable to the resource referred to by the request URL, then operation on those resources must fail. |
| Rule 4 | When constructing a URL from a physical storage path, the URL must be a member of the namespace that was traversed as a part of the request. |

Rule 1 provides a way of ensuring that a client is authenticated to operate against all of the resources that are covered by the request URL. Recall that the resources can be spread across different physical locations. In this case, there may be instances where the different physical locations have authentication models or permissions that are different from those that are associated with the resources that are referred to by the request URL. In this instance, the request for the additional resources must fail. Otherwise, a possible security breach could result if the client were allowed to receive data for which they were not properly authenticated.

Rule 2 prevents a response that contains data that would more than likely be incorrect since any request directed at that resource would be handled by a registered ISAPI extension. This situation recognizes that there may be an ISAPI extension that is registered with the server to handle all of the requests that are received for a certain virtual root or resource. For example, for any given folder, there may be an ISAPI extension that is registered to handle requests for all ".doc" extension files that are contained in that folder. If the client does a PROPFIND at a depth of infinity on the namespace associated with that resource file, then returning the file would be inappropriate since an ISAPI extension has been registered to handle all of the requests for those particular file extensions. In this case, the request must fail.

Rule 3 addresses situations where there are so-called wild-card script mapping scenarios that are defined for subsequent resources and that are not applicable to the specified resource. A script map is a mechanism that instructs the server to run certain ISAPI extensions in connection with certain resources. Wildcard script mapping allows for instructions that may do such things as specify an ISAPI extension for any specified resource or for any specified method. In this regard, rule 3 determines whether there is an ISAPI extension that is associated with a subsequent resource (similar to rule 2), and if so, the operation on those subsequent resources fails.

Rule 4 addresses the situation that multiple virtual roots can grant access to a single file or resource. Accordingly, without translating in terms of the request URL's namespace, the response will look as if the resources returned do not satisfy the request.

Of course, it is possible to have rules other than those described above without departing from the spirit and scope of the invention.

With the rules having been defined, step 304 receives a request that, when implemented, can traverse a plurality of the different physical locations that are associated with the virtual roots of a specified namespace. Step 306 ascertains whether implementation of the request would violate any of the defined rules. If none of the defined rules would be violated, then step 308 executes the request. If, however, implementation of the request would violate one of the rules, step 310 returns an appropriate message to the client. In the described example, the message that is returned to the client is a "502" response. The "502", or BAD GATEWAY response tells a client that the server could not get to the data requested via the specified request URL. When a client receives a 502 response, the client can retry the requested operation directly against the URL for which the request failed. When this is done, the namespace for the request URL and the resource share common attributes, and the request/response sequence can proceed.

Move/Copy Support

Each namespace is capable of having a number of administrative attributes set for the namespace. Exemplary administrative attributes include internet ratings, access permissions, Internet Protocol restrictions, and the like. When a client requests to MOVE or COPY a resource, they are asking to operate against the data referred to by the request URL's namespace and not against the namespace itself Accordingly, when WebDAV tool 16 executes a COPY or a MOVE, none of the administrative attributes that are explicitly set on the namespace that refers to the resource are moved or copied—with the exception of any MIME maps that are associated with the resource (such as those that are defined as properties as described above). This ensures that the destination namespace for the resource retains its administrative attributes.

Figure 11:
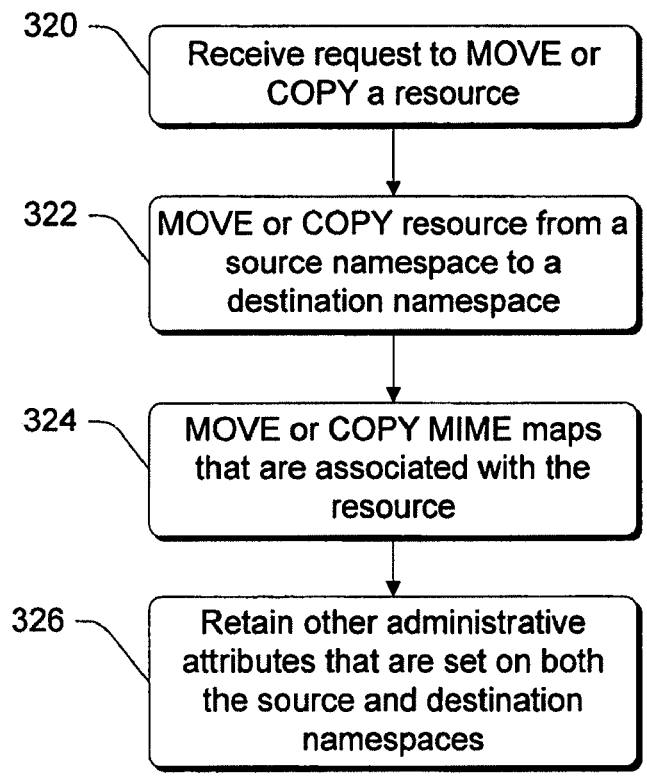
FIG. 11 is a flow diagram that describes steps in a method in accordance with one embodiment of the invention.

FIG. 11 shows a flow diagram that describes steps in a method in accordance with one or more embodiment of the invention. Step 320 receives a request from a client to MOVE or COPY a resource. Step 322 executes the MOVE or COPY request by moving or copying the specified resource from its source namespace to a destination namespace. Step 324 moves or copies the MIME maps that are associated with the resource that is moved in step 322. Step 326 retains other administrative attributes that are set on both the source and destination namespaces.

Thus, in this embodiment, namespace configurations cannot be changed by performing an operation that traverses virtual roots. That is, namespace configurations are maintained in both the source and destinations namespaces when a client executes a MOVE or a COPY request against the server.

PROPFIND

Figure 12:
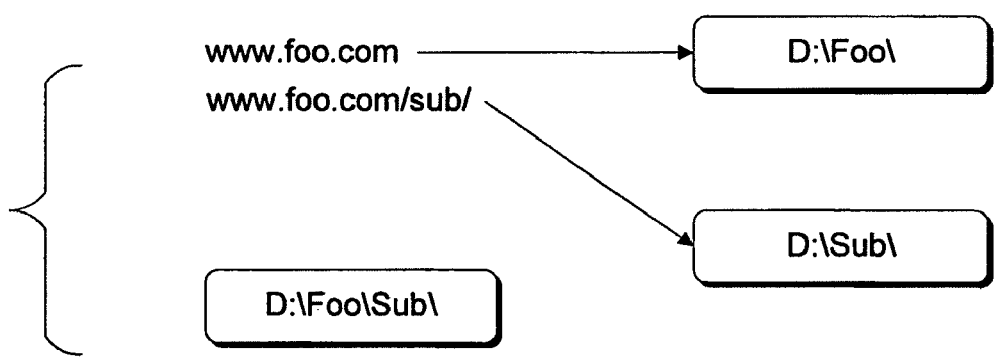
FIG. 12 is a diagram that illustrates one aspect of namespace virtual roots.

As the above discussion indicates, it is very possible that WebDAV requests will traverse different physical locations that are unified (from the client perspective) under a common namespace. The PROPFIND method is no exception. When a client makes a non-zero depth PROPFIND request, it is possible that the operation will transverse into a namespace that may or may not be physically separated. Thus, the traversal needs to carefully track the structure of the namespace and not the physical layout of the file system. Specifically, a PROFIND (non-zero depth) will enumerate not only the specified URL resource, but also the child virtual roots of the request URL. There is a possibility that there will be a conflict between a physical location and a child virtual root. If there is such a conflict, then the namespace (or child virtual root) should be enumerated. Specifically, if a collection resource (i.e. a file system directory) exists that would be accessible via a URL that is also a child virtual root, then that directory would not be enumerated with the rest of the resources contained in the response. Instead, the resources of the child virtual root would be enumerated. As an example, consider FIG. 12. In this example, the namespace "www.foo.com" is mapped to the physical location "D:\Foo\". There is a directory under the "www.foo.com" namespace called "\sub\", i.e. www.foo.com/sub/. This directory (also a child virtual root) is mapped to the physical location "D:\Sub\". Consider also that there is a physical location designated "D:\Foo\Sub\". In this example, the directory "D:\Foo\Sub\" would be accessible via a URL that is also a child virtual root, i.e. www.foo.com/sub/. When a client does a PROPFIND however, they do not want to have the contents of the directory "D:\Foo\Sub\" enumerated. Rather, they want to have the contents of the physical directory "D:\Sub\" enumerated. This is because the directory "D:\Sub\" is the one that is properly mapped from the URL www.foo.com/sub/.

Figures 13, 14:
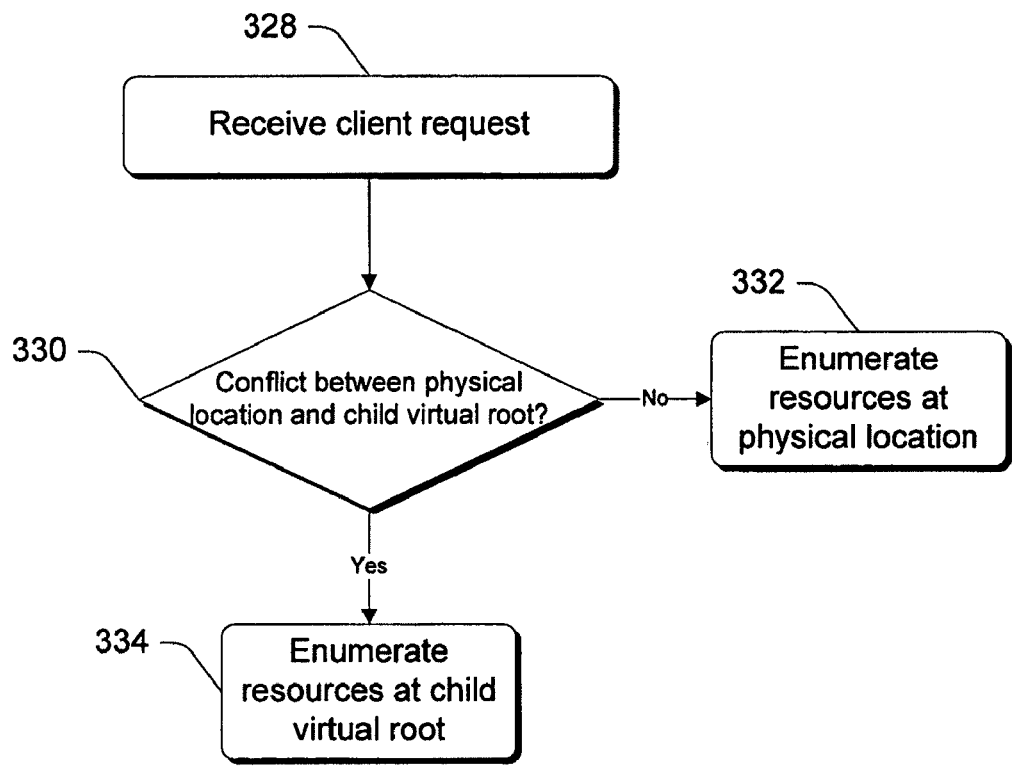
FIG. 13 is a flow diagram that describes steps in a method in accordance with one embodiment of the invention.
FIG. 14 is a diagram of a data structure in accordance with one embodiment of the invention.

FIG. 13 shows a flow diagram that describes steps in a method in accordance with this embodiment. Step 328 receives a client request. In this example, a PROPFIND request is received. Step 330 determines whether there is a conflict between a physical location and a child virtual root. If there is not conflict, then step 332 can enumerate the resources contained at the physical location. If, on the other hand, there is a conflict between a physical location and a child virtual root, step 334 enumerates the resources of the child virtual root.

Thus, with this approach, and with the appropriate access rights, a client can enumerate the virtual roots on a server.

Scriptmaps and Inclusion Lists

A script map is a registration mechanism by which an ISAPI extension can register to handle certain file extensions. In Microsoft's IIS, the script map is an entry in the metabase that defines what extension should be used to satisfy any given request based upon the URL's extension. For example, Active Server Pages (.asp) scripts are handled by the ASP ISAPI extension because of an entry in the scriptmaps that associates the ".asp" URL extension to the ASP.DLL executable installed on the server.

In the described embodiment, the registration of an ISAPI extension includes a list of HTTP verbs that are to get handled by the ISAPI extension. So, for example, an ISAPI extension can register to handle all verbs of a given type, e.g. GET requests, and all other verb requests can and should be handled by the default server processing.

FIG. 14 shows a data structure in the form of a scriptmap in accordance with this embodiment. Here, a verb field 400 contains one or more verbs, and an ISAPI extension field 402 contains the name of the ISAPI extension that is registered to handle the verbs in the corresponding verb field. In this example, an ISAPI extension GET.DLL is registered to handle the verb GET. All other verbs should be handled by the default web server processing.

Figure 15:
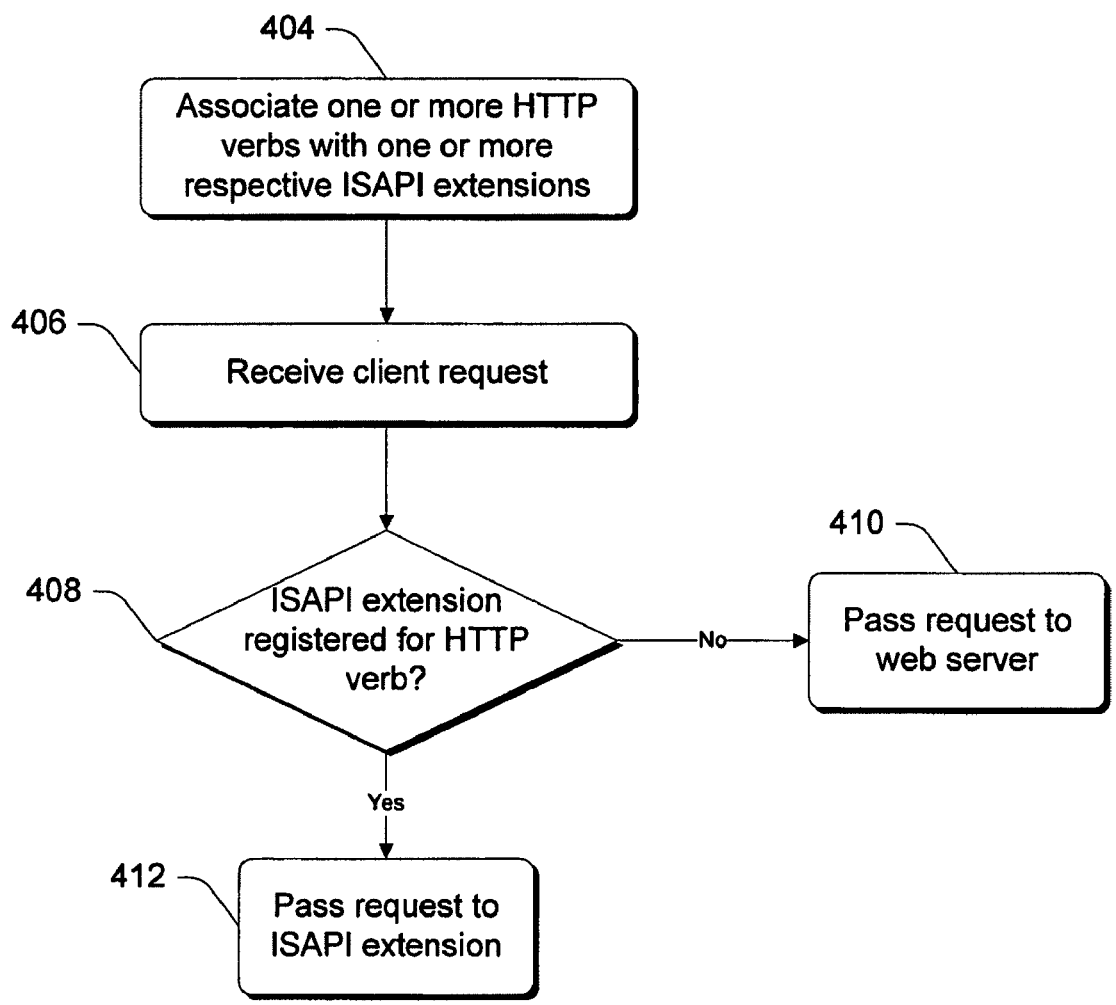
FIG. 15 is a flow diagram that describes steps in a method in accordance with one embodiment of the invention.

FIG. 15 is a flow diagram that describes steps in a method for associating HTTP verbs with ISAPI extensions. Step 404 associates one or more verbs with an ISAPI extension. An exemplary association is discussed above in connection with the excerpt of the scriptmap shown in FIG. 14. Step 406 receives a client request. Step 408 determines whether there is an ISAPI extension that is registered for an HTTP verb that is contained in the client's request. If there is not, then step 410 passes the request to the web server for processing. If, however, there is an ISAPI extension that is registered for the verb contained in the client's request, then step 412 passes the request to the ISAPI extension for processing.

CONCLUSION

Various embodiments described above integrate WebDAV processing with conventional internet servers. The integration techniques ensure that there is a delegation of duties between WebDAV tools and the web server. In addition, measures are provided for accurately setting and retrieving appropriate content types that are associated with a particular resource. Further, techniques are provided that support namespace segregation when such is done in the context of virtual roots. Consideration is given to the fact that WebDAV processing can traverse multiple virtual roots and therefore measures are taken to ensure that processing, as perceived on the client end, is not hampered. In addition, techniques for registering ISAPI extensions in connection with HTTP verbs that are received in a client's request are provided that add flexibility to request handling.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed:

1. A computer-readable storage medium having stored thereon computer executable instructions which, when executed by a processor, cause the processor to store content, the computer-readable storage medium comprising:
   instructions to accept a first request, the first request comprising a specified namespace, a specified resource name, a specified resource name extension, and a specified content type;
   instructions to determine a scoping map that is applicable to the specified namespace, the scoping map comprising at least one entry, the entry comprising a mapping between a mapped resource name extension and a mapped content type;
   instructions to determine that one or more entries in the scoping map is inconsistent with the specified content type;
   instructions to store an association property, at a location exclusive of the scoping map, that relates the specified resource to the specified content type; and
   instructions to utilize the association property to retrieve the specified content type, responsive to a second request associated with the specified resource name.

2. The computer-readable storage medium of claim 1, wherein the first request is a WebDAV request.

3. The computer-readable storage medium of claim 2, wherein the association property is stored using the WebDAV property-setting mechanism.

4. The computer-readable storage medium of claim 2, wherein the WebDAV request is a WebDAV PUT request.

5. The computer-readable storage medium of claim 1, wherein the scoping map further comprises a MIME map.

6. The computer-readable storage medium of claim 1, wherein the specified namespace has at least one virtual root, wherein a virtual root facilitates scoping namespaces with custom attributes.

7. The computer-readable storage medium of claim 1, wherein the specified namespace has a plurality of virtual roots that point to different physical locations.

8. A method of storing content on a web server, the method comprising:
   receiving a first request at the web server, the first request comprising a specified URL and a specified content type, the specified URL comprising a specified namespace, a specified resource name, and a specified resource name extension;
   obtaining a scoping MIME map that is applicable to a portion of the specified URL, the scoping MIME map comprising a plurality of entries that relate mapped resource name extensions to mapped content types;
   determining that one or more of the plurality of entries is incompatible with the specified content type;
   storing a relationship, in a location exclusive of the scoping MIME map, between the specified URL and the specified content type; and
   determining, at the web server, to utilize the relationship to retrieve the specified content type corresponding to a second request associated with the specified URL.

9. The method of claim 8, wherein the first request is a WebDAV request.

10. The method of claim 9, wherein the relationship between a portion of the specified URL and the specified content type is stored using the WebDAV property-setting mechanism.

11. The method of claim 9, wherein the WebDAV request is a WebDAV PUT request.

12. A computer system, comprising:
    at least one processor;
    at least one memory coupled to said at least one processor, the at least one memory having stored therein computer-executable instructions that, when executed on the at least one processor, cause the system to perform operations comprising:
    receiving a request to store content, the request comprising a specified URL and a specified content type, the specified URL comprising a specified namespace, a specified resource name, and a specified resource name extension;
    obtaining a scoping map applicable to the specified namespace;
    determining that an entry in the scoping map conflicts with the specified content type;
    storing an association, in a location exclusive of the scoping map, between the specified content type and the specified URL; and
    using the association to retrieve the specified content type, responsive to a request to get content corresponding to the specified URL.

13. The computer system of claim 12, wherein the request to store content is a WebDAV request.

14. The computer system of claim 13, wherein the relationship between a portion of the requested URL and the requested content type is stored using the WebDAV property-setting mechanism.

15. The computer system of claim 12, wherein the WebDAV request is a WebDAV put request.

16. The computer system of claim 12, wherein the scoping map further comprises a MIME map.

* * * * *